United States Patent
Fontana et al.

(10) Patent No.: US 8,131,887 B2
(45) Date of Patent: Mar. 6, 2012

(54) AUTOMATICALLY CUSTOMIZING ONE OR MORE INTERACTIVE PORTABLE DISPLAY DEVICES WITH A CALCULATOR UNIT BY EXCHANGING PARAMETER DATA

(75) Inventors: Paolo Fontana, Sappada (IT); Davide Piccolo, Gorizia (IT)

(73) Assignee: Eurotech SpA, Amaro (UD) (IT)

( * ) Notice: Subject to any disclaimer, the term of this patent is extended or adjusted under 35 U.S.C. 154(b) by 173 days.

(21) Appl. No.: 12/597,654

(22) PCT Filed: Apr. 24, 2008

(86) PCT No.: PCT/IB2008/001015
§ 371 (c)(1),
(2), (4) Date: Oct. 29, 2009

(87) PCT Pub. No.: WO2008/132584
PCT Pub. Date: Nov. 6, 2008

(65) Prior Publication Data
US 2010/0161839 A1 Jun. 24, 2010

(30) Foreign Application Priority Data

Apr. 26, 2007 (IT) .............................. UD2007A0076

(51) Int. Cl.
*G06F 3/00* (2006.01)
*G06F 3/02* (2006.01)
*G08B 6/00* (2006.01)
*H04R 3/00* (2006.01)

(52) U.S. Cl. .................. 710/10; 710/8; 710/9; 345/168; 348/207.1

(58) Field of Classification Search ................ 710/8–10; 345/168; 348/207.1
See application file for complete search history.

(56) References Cited

U.S. PATENT DOCUMENTS

| 6,903,762 B2 * | 6/2005 | Prabhu et al. .............. 348/207.1 |
| 6,996,275 B2 * | 2/2006 | Edanami ....................... 382/218 |
| 7,304,677 B2 * | 12/2007 | Keelan et al. ............ 348/333.01 |
| 7,983,920 B2 * | 7/2011 | Sinclair, II .................... 704/270 |
| 2005/0035874 A1 | 2/2005 | Hall et al. |

FOREIGN PATENT DOCUMENTS

| EP | 0408867 A2 | 1/1991 |
| EP | 0999435 A2 | 5/2000 |
| EP | 1058450 A1 | 12/2000 |

(Continued)

*Primary Examiner* — Tammara Peyton
(74) *Attorney, Agent, or Firm* — Panitch Schwarze Belisario & Nadel LLP

(57) ABSTRACT

An electronic processing apparatus comprises one or more remote interactive display devices and a calculator unit, wherein the display device comprises at least a screen, a connector selectively connectable to the calculator unit, a user interface device and a microprocessor, whereas the calculator unit comprises at least one or more connectors, able to be selectively connected to the connector, a processor and a non-volatile memory. There is also a single connection element able to connect the connector and a selected one of the connectors of the calculator unit, both for data exchange and also for the transfer of energy for electric feed. The display device, through the connection element is able at least to transmit, through the connector, information relating to the own functioning parameters thereof to the calculator unit, which are compared with predetermined information recorded in the non-volatile memory so as to identify and select the functioning parameters of the display device and to obtain an automatic configuration of the display device.

19 Claims, 2 Drawing Sheets

FOREIGN PATENT DOCUMENTS

| | | |
|---|---|---|
| EP | 1266699 A1 | 12/2002 |
| EP | 1779802 A2 | 5/2007 |
| WO | 9811840 A1 | 3/1998 |
| WO | 9960939 A1 | 12/1999 |
| WO | 0075900 A1 | 12/2000 |
| WO | 0189368 A2 | 11/2001 |

* cited by examiner

AUTOMATICALLY CUSTOMIZING ONE OR MORE INTERACTIVE PORTABLE DISPLAY DEVICES WITH A CALCULATOR UNIT BY EXCHANGING PARAMETER DATA

CROSS-REFERENCE TO RELATED APPLICATIONS

This application is a Section 371 of International Application No. PCT/IB2008/001015, filed Apr. 24, 2008, which was published in the English language on Nov. 6, 2008, under International Publication No. WO 2008/132584 A1 and the disclosure of which is incorporated herein by reference.

BACKGROUND OF THE INVENTION

The present invention concerns an electronic processing apparatus provided with one or more interactive display devices, of the remote type, able to present graphic and/or alphanumerical information processed by processing units of the incorporated type or by an electronic calculator, and to interact with a user.

The present invention is applied, preferably although not exclusively, in fields where advanced graphic functions and interactivity are not necessary full-time, such as the domestic field, as in control devices and/or supervision devices for heating plants, lighting, anti-theft devices; in the personal field such as palm top calculators, miniaturized calculators to be incorporated in articles of clothing, or localization and/or telecommunication devices; in the industrial field for complex plants, normally lacking an interaction interface with the operator.

Interactive display devices are known, separated physically from the calculator or calculator unit with which they operate.

In these devices, when the display device is first switched on, it is normally necessary for the user to intervene in order to adjust the functioning parameters. Moreover, the display device needs separate connection cables, at least one to receive the signals to be translated into graphic form, bulky and costly, and another intended for feed.

These characteristics therefore entail both an increase in the costs of production of the devices, and also delays in preparing the apparatuses and problems in the management of the cables. Furthermore, it is inadvisable to connect or disconnect a standard display device from a calculator unit that is already switched on, due to possible differences in the respective feed currents and/or possible unwanted electrostatic discharges.

Interactive display devices are also known which form a single body with the calculator unit. In this context there is an ever-growing need to reduce the bulk, in order to improve the characteristics of portability of the calculator units and their use in non-usual operating situations.

This requirement cannot always be satisfied, mainly due to the intrinsically large sizes of the screen. Moreover, when the calculator unit is switched on, the display device is always fed, even when there is no need for it to be used; this characteristic entails an increase in the average consumption of the calculator unit and, if it is portable, reduces its operating autonomy.

WO-A-00/75900 shows a security alarm system that comprises a control unit that indicates simple alarm conditions based on signals received from peripheral units. The peripheral units can be configured automatically or remotely by means of a series of user interfaces, such as a keyboard or display screen.

WO-A-99/60939 illustrates an interactive computer-assisted surgical system, with a display controller of a three-dimensional model and comprising insertion devices, such as a touch screen or voice recognition systems.

US-A-2005/0035874 concerns a downhole network for boring, which supplies information in real time from the downhole components by means of suitable downhole nodes and tophole nodes. The system comprises a user interface to display the information received and depth components such as temperature and pressure sensors.

EP-A-0999435 concerns a system to determine the temperature of a device; the system allows to insert a request, by means of the user interface, and to receive a relative reply from the audio or visual system.

WO-A-98/11840 shows a position detector sensor to confirm the position of a medical tube.

Personal computers are becoming more and more widespread in everyday life and in the environment, mixing with the environment itself (pervasive computing) and can also be applied directly on the user (wearable computing); for example, personal computers worn on the wrist or inserted behind the walls of a house are becoming more and more common. In these applications, the more a device is invisible, ergonomic and autonomous, the more it is advanced and therefore appreciated by the market. There is a growing requirement in the market for smaller and smaller devices, integrated and with low consumption, which, at the moment of use, can still be used easily and comfortably, in particular with graphic and/or input interfaces that are ergonomically convenient.

One purpose of the present invention is to achieve an electronic processing apparatus in which it is possible to separate the computer display from the main device, so as to allow the latter to be miniaturized and reduce average consumption and to wear the display on a portable object, but which can be connected to a main calculator unit only when necessary (for example to control the state, impart commands via a touch screen, output analysis . . . ).

Another purpose is to achieve an electronic processing apparatus comprising a remote interactive display device, separate from the calculator unit, but able to be integrated with it both quickly and easily, and to perfect a method for the automatic configuration of the necessary parameters, such as for example the resolution of the screen, in order to display the images correctly, that is, to be able to connect any screen so that the main calculator unit recognizes it and consequently adapts the functioning and resolution parameters automatically.

Another purpose of the present invention is to achieve an electronic processing apparatus able to derive the source of feed of the display device from that of the calculator unit, by means of a single connection cable, through which the graphic information signals are also transferred.

Another purpose is to obtain the connection of the display device to the calculator unit also when the calculator unit is already switched on, that is, to be able to hot-plug the remote display, without switching off the main calculator unit.

The Applicant has devised, tested and embodied the present invention to overcome the shortcomings of the state of the art and to obtain the purposes indicated above, and also other advantages.

BRIEF SUMMARY OF THE INVENTION

The present invention is set forth and characterized in the independent claims, while the dependent claims describe other innovative characteristics of the invention or variants to the main inventive idea.

In accordance with the above purposes, an electronic processing apparatus comprises one or more remote interactive display devices and a calculator unit.

The display device comprises at least a screen, a connector selectively connectable to the calculator unit, a user interface device and a microprocessor.

The calculator unit comprises at least one or more connectors, suitable to be selectively connected to said connector, a processor and a first memory of a non-volatile type.

According to a first feature of the present invention, the electronic processing apparatus comprises a single connection element able to connect said connector of the display device and a selected one of the connectors of the calculator unit, both to exchange data and also to transfer energy for the electric feed.

The display device, through the connection element, is able at least to transmit, through said connector, information relating to its own functioning parameters to the calculator unit, which are compared with predetermined information recorded in said non-volatile memory of the calculator unit and comprising the characteristic properties of the display device, the graphical resolution of the screen, the characteristics of the user interface device to identify between said predetermined information recorded in said non-volatile memory the proper functioning parameters of the display device and to select the related functioning parameters of the calculator unit required to manage the, and communicate with, the display device in order to obtain an automatic configuration of the display device.

The automatic configuration is obtained as soon as the connection is made between the display device and the calculator unit.

In this way, we have a display device that is separate from the calculator unit, but which can be integrated with it quickly and easily when necessary.

In fact, thanks to the automatic configuration, it is possible to connect any screen, so that the main calculator unit recognizes it and consequently adapts the functioning and resolution parameters automatically.

Typically, it is possible to have the calculator unit which, according to the results of the comparison, is able to organize the data to be received and transmitted to the display device so that they are compatible with the selected functioning parameters of the display device.

Generally, the functioning parameters comprise the characteristic properties of the display device, the graphical resolution of the screen, the characteristics of the user interface device and similar or other information.

The electric feed energy of the present invention comes within the range of use of microelectronics and allows to feed the entire display device, so that the display device may also not be provided with autonomous feed.

One advantage of the present invention is that the connection times of the connection cable are reduced, and therefore the establishment of the connection between the calculator unit and the display device, especially in operating contexts where frequent and repetitive maintenance, diagnostics or control operations, and the supervision of incorporated calculator units, are required. Other advantages consist in having improved the mechanical stability of the connection means, and in the reduction of their number, with a consequent reduction in the production costs both of the display devices and of the calculator units.

An advantageous characteristic of the present invention is also the simplification of the production of the casing, due to the presence of a container which houses all the peripherals of the display device, with a single mechanical aperture towards the outside for the connector. This improves the waterproofing and properties of resistance to humidity of the display device, with particular reference to applications like those of the personal calculator unit or calculator units for articles of clothing.

Another advantage of a display device according to the present invention, equipped with an external source of electric feed, is that the weight and size of both the calculator unit and of the device are reduced. These reductions allow to locate the calculator unit in any position whatsoever, and in an advantageous position, only when it is actually used, to connect the interactive display device to the calculator unit.

The possibility of separating and disconnecting the display device from the calculator unit also has the consequence that the average consumption is reduced, with benefits both in terms of a further reduction in the size and an extension of its autonomy, if the calculator unit is equipped with feed, for example a battery.

According to a variant, the display device according to the invention is equipped with a plurality of external connection means which share the electric connections according to a circuit disposition for the transfer of data in parallel.

According to this variant it is therefore possible to connect several peripheral units, expanding the functions both of the calculator unit and of the display device. For example, to connect a satellite localization antenna which, connected through a second connection means of the display device, allows a calculator unit, equipped with a valid program, to act as a satellite navigational system too.

According to a further advantageous form of embodiment, the screen has advanced graphic functions suitable to present images with complex contents.

The user interface device can typically consist of a keyboard. Another solution provides to use a touch-screen, possibly with buttons and other actuators, mechanical and otherwise, which allow to navigate inside a graphical environment interacting with the central unit, imparting commands as is commonly possible by means of the usual input devices (mouse, keyboard . . . ).

According to a variant, the user interface device may be a film with tactile functions which partly or totally covers the area of said display means.

According to another variant, the user interface device may be a microphone to impart voice commands. This solution is particularly indicated for display devices designed to be used and to assist persons affected by physical disabilities.

It is therefore clear that with the present invention it is possible to add functions to an already existing system without configuring either from the display side or from the side of the system in which it is inserted.

The microprocessor of the display device is suitable to exchange information with the calculator unit through the connection element and to transfer said information in a format comprehensible for the screen. One advantage of the present invention is the assistance that said microprocessor can give to the calculator unit, by making available part of the processing capacity, by transferring information through the connector of the display device.

If the calculator unit already has its own display, the display device according to the present invention is able to display different information from that displayed on the main display, or to duplicate the same.

According to another variant, the interactive display device according to the invention is equipped with particular sensors dedicated to detect environmental values, such as temperature, pressure and humidity, or to monitor personal parameters, such as heart beat or blood pressure.

According to another variant of the present invention, the interactive display device is equipped with an element sensitive to the position in which the device lies, so that the image presented on the screen can be rotated automatically without obliging the user to intervene by modifying the configuration parameters.

According to a characteristic feature of the present invention, the connection between the display device and the calculator unit through said connector may be made at any moment without causing functioning anomalies of the electronic circuitry. That is, there is the possibility of hot-plugging/unplugging, advantageously with an automatic recognition of the resolution of the display. In particular, the invention may be used in a more complex system, already functioning, without disturbing the current functions and adding greater performance to the system.

Therefore, the present invention allows the instantaneous integration of a display in an embedded environment (pervasive or wearable), in which the graphic supervision and control interfaces are not normally required and are necessary only in the steps of installation, repairs/maintenance, command execution or setting. In this way we have more integrated and miniaturized systems, given that often it is the display itself that causes the real bulk.

In general the present invention is greatly miniaturized and has a very reduced weight, since the screen can be separated and connected to the calculator unit only when necessary, and is therefore able to be transported or worn by a user, for example used in maintenance activity and/or to control a computer, then disconnected and put back in a pocket or a bag waiting for the next use.

The invention is advantageously applied in a distributed system, in which it can recognize autonomously to which port/plug it is connected, so as to allow a more immediate and simpler use for the user. For example, it is advantageously applied in the case of a rack of a system server, where it is necessary to intervene on a single unit inserted among many other units. In this case, by connecting the connection socket of the device according to the present invention by means of a suitable connection cable in the port of a determinate unit, it is possible to have immediate access to the relative video output and the configuration only of the unit desired.

A plurality of calculator units can also be provided, distributed in the environment, such as for example in a system of the pervasive type, or in a demotic environment to manage various plants (heating/cooling, lighting), control units, domestic appliances. The calculator units can thus be conveniently managed by means of a display device which is connected to them when necessary.

In accordance with the above purposes, the present invention also concerns a method for the autonomous configuration of the functioning parameters of one or more remote interactive display devices and/or a calculator unit of an electronic processing apparatus.

The method according to the present invention comprises a step of connecting the display device to the calculator unit by means of a single connection element by means of which said calculator unit both provides energy for the electric feed to the display device, and also receives and transmits data from/to the display device, and a step of automatic configuration in which said display device, when the connection is made between one of its connectors and the connection element, transmits information relating to its own functioning parameters to the calculator unit, which compares the information received with predetermined information recorded inside it and, according to the result of the comparison, identifies and selects the desired functioning parameters of the display device in order to obtain an automatic configuration of the display device.

Typically, the functioning parameters comprise the characteristic properties of the display device, the graphic resolution of said screen, the characteristics of one or more user interface devices integrated into the display device.

One advantage of the configuration method according to the present invention is that it exempts the user from assigning the functioning parameters when the display device is connected to the calculator unit.

Another advantage of the method according to the present invention is that it extends the graphic display area, if the calculator unit is already equipped with its own display means. This extension can be finalized, for example, to display other information of an applicative and/or diagnostic nature.

According to a variant, when the display device is connected to the calculator unit by means of the connection element, there is a step in which the display device autonomously actuate a modification of its own functioning parameters by setting a series of elementary graphic configurations until a sequence of data arriving from the calculator unit is received, intended for display and suitable for the graphic configuration currently selected.

This gives another advantage of the method according to the present invention, that is, when a calculator unit is unable to adapt its own graphic resources, or it does not recognize among its own recorded information the characteristics and functioning parameters of the display device that is connected, it will be the display device that is configured in a mode suitable for the range desired by the existing graphic standards.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
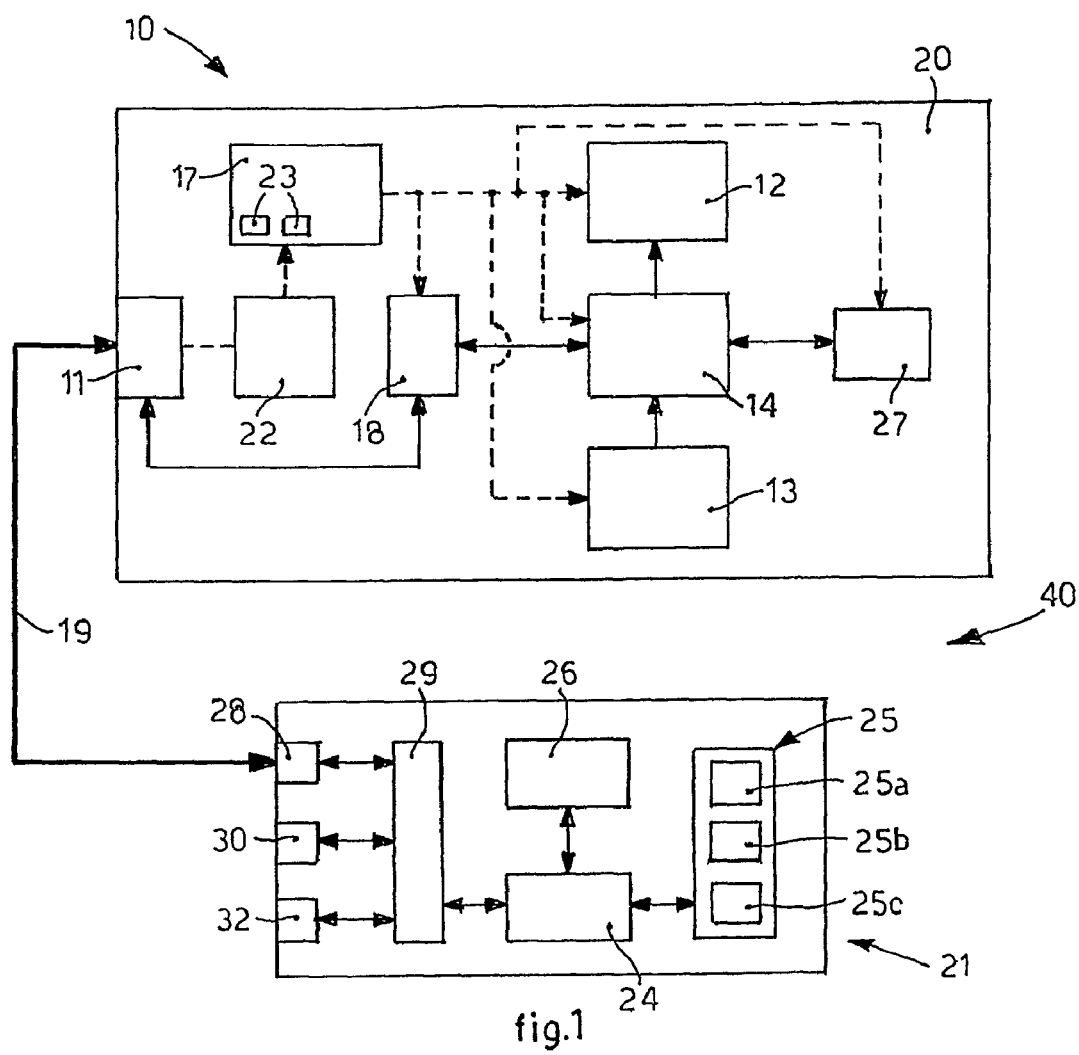
FIG. 1 is a block diagram of an interactive display device according to the present invention.
Figure 2:
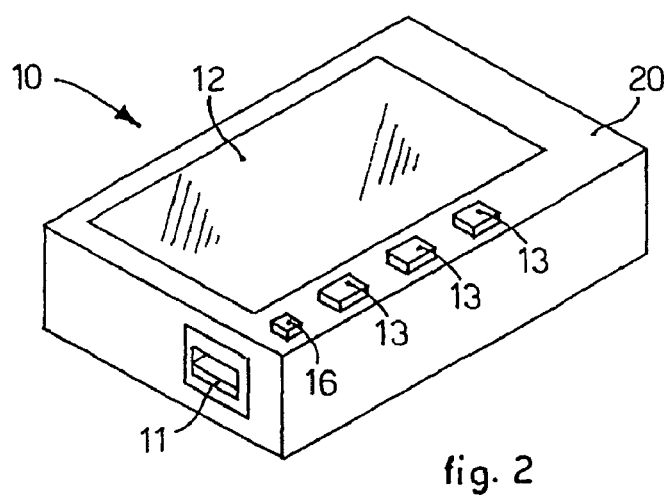
FIG. 2 is a three-dimensional view of a remote display device according to the present invention.

With reference to FIG. 1, an electronic processing apparatus 40 according to the present invention comprises a display device 10, and a computer 21, selectively connectable to each other.

The display device 10 can be used to display images and/or alphanumerical information and to receive commands from the user of the computer 21 to which the display device 10 is connected.

In particular, the computer 21 is of the low-consumption type, and able to be fed by batteries, without a screen and therefore extremely miniaturizable, such as a palm top or a wearable computer or of the pervasive type. The computer 21 has the classic functions of a traditional personal computer, including providing an output image and receiving commands from the outside. As shown schematically in FIG. 1, the computer 21 comprises a processor 24 with a calculation capacity that is indicated, for convenience, by the reference 25, a first non-volatile memory 26, for example a Flash memory (able to maintain the data even when it is not fed), in which the operating system of the computer 21 is also installed, and a plurality of connectors 28, 30, 32 (theoretically n connectors for n devices 10 which can be connected to the computer 21) able to connect, by means of a relative cable 19, to corresponding connectors 11 of an equal number n of devices 10, as will be shown in more detail hereafter in the description.

The cable 19, typically a USB cable, is of the type with four conductors, two of which transmit the feed arriving from the computer 21, while the other two conductors are suitable for transferring data. It is clear that it would be possible to have only two conductors, effecting both the transfer of feed energy and of data, exploiting known technologies (conveyed wave).

The interface between the connectors 28, 30 and 32 and the processor 24 is given by the communication bus 29, in this case a master USB. The limit to the number of devices 10 which can be connected to the computer 21 depends on the calculation capacity of the latter. To each device 10 a fraction 25a, 25b, 25c of the calculation capacity 25 available on the computer 21 is reserved, that is, a fraction of area of memory which contains the information to be displayed and an activity of the processor 24 to manage the other activities correlated to the device 10.

The display device 10 comprises (FIGS. 1 and 3) an LCD screen 12, an input keyboard 13, a microprocessor 14 advantageously associated with a second non-volatile memory 27, disposed inside a container 20 advantageously dust-proof and damp-proof, a feed unit 17 and a connector 11 that supports the connection by means of the USB cable 19, to one of the connectors 28, 30, 32 of the computer 21. In particular, it is a USB line suitable to transfer both the feed energy and also the application data to various internal modules.

The USB line adopted respects the USB 2.0 standard, with a data transfer speed of up to 480 Megabit/s.

It is clear, however, that the present invention may provide another connection on a generic bidirectional link, with a future definition, standardization and implementation.

The feed unit 17 is able to pick up feed energy through the connector 11, to redistribute it to the internal modules of the device 10, that is, the screen 12, the microprocessor 14, the keyboard 13 and the non-volatile memory 27. Downstream of the connector 11 there is an inlet filter 22 to soften possible harmful impulses of current/tension. The input stages are sized for frequent connections/disconnections, using components strong enough and suitable for this type of stress.

Furthermore, both on the computer 21 and on the device 10 there are DC/DC stages, indicated schematically and for convenience by the reference number 23, only in the device 10, protected against overcurrents, which convert the range tension (3.6-25 V) to the usable tensions of the circuit: 3.3V, 2.5 V, 1.8 V. These devices are chosen and sized to have minimum bulk and maximum conversion efficiency. In this way, the connection sequence can be conducted at any operating instant of the computer 21 without causing functional anomalies of the circuitry of either the computer 21 or the device 10.

To minimize energy consumption, both the device 10 and the computer 21 operate at minimum functioning tension possible for the various parts of the electronic circuit. For example, digital feed, dedicated to communication between the microprocessor 14 and the keyboard 13 and the LCD screen 12, is set at 1.8 V instead of 3.3 V, thus reducing the energy necessary by a consistent factor.

Both the microprocessor 14 and the processor 24 of the computer 21 are of the low-consumption type, based on ARM architecture, with the possibility of regulating the consumption thereof according to real functioning requirements.

All these ideas connected to the low-energy consumption have made it possible to miniaturize all the electronic components, so that the final sizes are determined by the LCD screen 12 and not by the electronic components themselves.

The low absorption of energy and hence of current by the device 10 allows it to come within the specification of the USB standard, allowing the device 10 to be connected to a standard USB port of any commercial computer.

The minimization of the energy absorbed also entails minimization of the energy irradiated, guaranteeing full safety during use, particularly to the physical person, who can wear the computer 21 and the device 10 for a long time.

The microprocessor 14 is connected to the connector 11 by means of a suitable communication bus 18 for the transmission and reception of data, in this case a USB slave, the main task of which is to transmit and receive data and information from/to the microprocessor 14 in order to channel to the connector 11 the information arriving from the keyboard 13 and to transmit images and video again arriving from the connector 11, to the LCD screen 12.

According to the invention, the LCD screen 12 is activated when the connector 11 is connected to the computer 21 by means of the suitable cable 19. Since the device 10 is connected to the computer 21 by means of the single cable 19, of a variable length, it is possible to add flexibility to the computer 21 allowing to delocalize its control console (achieved by the device 10 itself), to a position accessible for the operator, in all those cases where the computer 21 is inaccessible or accessible for short periods of time (for example in domotics or pervasive computing, where the electronic components "disappear" from the user's view).

According to a variant, not shown in the drawings, other peripherals can be connected to the device 10, which can act on a local level, that is, impart commands to the device 10 alone (such as regulating the contrast, zoom function, etc.), or on a remote level, imparting commands to the computer 21. In addition, the device 10 can also function as an additional expansion console and able to add new possibilities to the computer 21 towards particular peripherals (like memorization devices of the SD type, CF card, video capture devices, etc.). All this can be scaled down in terms of performance and costs, for example if the device 10 has to function only as a display, without other advanced interactions with the computer 21, it can be simplified and reduced in its capacities, thus reducing the costs thereof.

According to another variant of the present invention (FIG. 3), the device 10 comprises means to detect environmental parameters, for example a temperature sensor 15, a humidity sensor, a pressure sensor and/or an acoustic sensor or a sensor of electromagnetic waves in general.

The display device 10 can also comprise sensors for monitoring personal parameters, such as heart beat or blood pressure.

Figure 3:
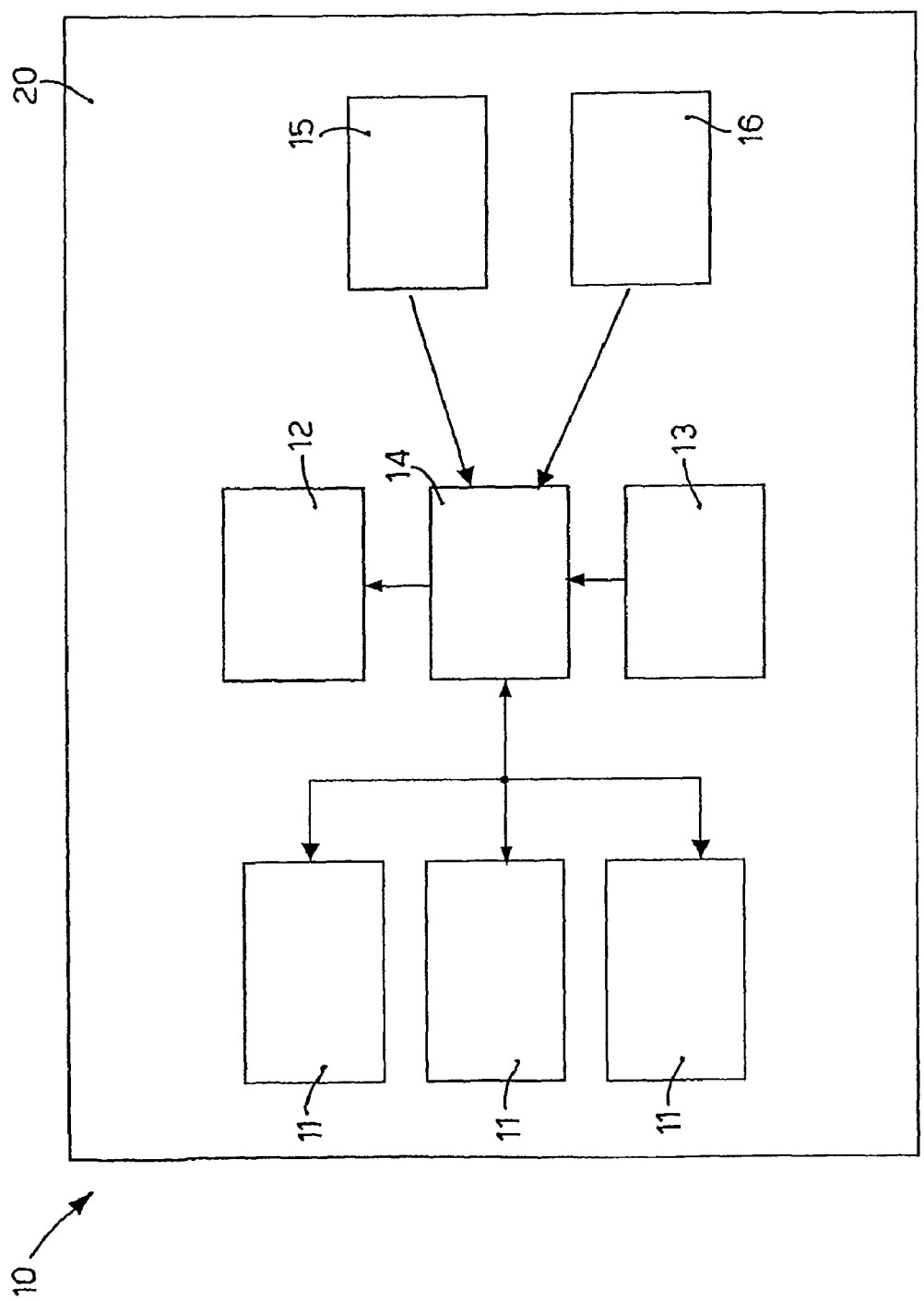
FIG. 3 shows a variant of the interactive display device according to the present invention.

In the embodiment shown in FIG. 3, the display device 10 also comprises a sensor to detect the position 16 in which the device lies, in order to adapt the display of the images on the LCD screen 12 to the actual position of the device 10.

Apart from the functions of display and of command acquisition (voice or mechanical), the present invention, thanks to the microprocessor 14, also has a processing capacity which can advantageously integrate the computing capacity of the computer 21. For example, to reduce the quantity of data to be transferred from the computer 21 to the device 10, it is possible to perform data compression on the side of the computer 21, and a corresponding decompression on the side of the device 10 (by the microprocessor 14). In the same way, according to another advantageous example, the device 10 can deal with voice command conversion, in the case where the invention is used as a console for voice commands (this conversion would otherwise be the task of the computer 21).

Therefore, the device 10 can function as a co-processor, to provide additional reprogrammable processing capacity according to the real requirements of the particular application in which it is used.

We shall now describe the functioning of the apparatus 40 according to the present invention.

When the connection cable 19, suitable for transferring both the feed and also a data transmission line, is connected between the connector 11 of the device 10 and the switched-on computer 21, the device 10 picks up the electric feed and is switched on. In FIG. 1, this flow of data is shown by the arrows drawn in continuous lines, whereas the flow of the electric feed is shown by the arrows drawn in dashes (in the computer 21, for convenience, only the flow of data is shown). This connection sequence can be carried out at any operating moment of the computer 21 without causing functional anomalies of the circuitry of either the computer 21 or of the device 10.

After it has been switched on, the device 10 is interrogated by the computer 21 concerning its characteristics (graphic resolution of the LCD screen 12 and other functions that it can make available, such as touch-screen, keyboard, voice recognition, pressure measurement capacity, luminosity, temperature, etc. . . . ) through the connector 11 and the bus 18 (associated with two of the conductors present in the cable 19). The transmission of recognition information from the device 10 to the computer 21 occurs by exploiting the USB standard which provides to send, when connection has been established, a family identification of the peripheral that is connected.

With the initial data exchange that flows along the USB connection through the connector 11, the device 10 thus communicates to the computer 21 its own functional characteristics in order to guarantee mutual recognition and, following this exchange of data, the computer 21 compares the characteristics of the device 10 with a reference table, memorized in the non-volatile memory 26.

When the computer 21 finds a match of the characteristics of the device 10 with the data in the table, it acts, according to the operating system memorized in the non-volatile memory 26, to use the device 10 in the manner programmed, advantageously organizing the data so that they are displayable with the correct resolution.

According to the information acquired, the computer 21 dedicates some of its computing resources and a space in the memory to the particular device 10 connected.

In particular, the computer 21 transmits to the microprocessor 14, again through the connector 11 and in the correct format, the graphic information generated by the present and active applications of the computer 21.

This mechanism allows to associate with different types of device 10, with different characteristics, different operating modes. For example, a high-resolution display allows to display sequences of images and text documents even with a complex formatting, a low-resolution display displays drop-down menus and short text messages.

From the moment the computer 21 and the device 10 are working in mutual connection and recognition, there is no limit to the information that can be exchanged (both in terms of quantity and of type). Then, as we said, there is also the possibility of delegating part of the activity of the computer 21 to the processing capacities of the microprocessor 14 of the device 10.

A preferred solution provides that the device 10, once connected to the computer 21, allows to display a graphic environment which shows the desktop of the operating system installed, that is, a user interface that allows interaction with the machine and access to all the functions by means of commands on the keyboard or touch screen.

Again after this initial data exchange, the microprocessor 14 transfers to the computer 21 the information generated by the keyboard 13 following the selection made by the user of the display device 10.

Therefore, according to the present invention, different versions according to the cited variants of the display device 10 can be connected simultaneously or at different times, to the same computer 21. After each of the above connection operations, the user of the display device 10 is exempted from carrying out configuration operations. In fact, such operations are automatically managed by the computer 21 and the display device 10.

If the device 10 is connected to a computer 21 which is not able to recognize its characteristics, then the device 10 autonomously actuates a modification of its own parameters. Said modification is achieved by setting a series of elementary graphic configurations, until a sequence of data arriving from the computer 21 is received, intended for display and suitable for the graphic configuration currently selected. The elementary graphic configurations, as well as other information for the recognition of determinate variants and/or types of computer 21 (for example if the computer 21 consists of a low-level hardware, such as a PLC controller associated with a machine to effect operations/automations of an industrial type, or an electronic control unit of an automobile, a time thermostat, electronic cards to control domestic automation and suchlike), are registered in reference tables memorized in the non-volatile memory 27 of the device 10, so as to be always available.

It is clear that modifications and/or additions of parts and/or steps may be made to the electronic processing apparatus and the method as described heretofore, without departing from the field and scope of the present invention.

It is also clear that, although the present invention has been described with reference to some specific examples, a person of skill in the art shall certainly be able to achieve many other equivalent forms of electronic processing apparatus and configuration method, all of which shall come within the field of the present invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An electronic processing apparatus comprising one or more remote interactive display devices and a calculator unit, wherein the display device comprises at least a screen, a connector selectively connectable to the calculator unit, a user interface device and a microprocessor; wherein the calculator unit comprises at least one or more connectors able to be selectively connected to said connector, a processor and a first non-volatile memory, wherein said electronic processing apparatus further comprises a single connection element able to connect said connector and a selected one of said connectors of the calculator unit, both for data exchange and also for the transfer of energy for electric feed; wherein the display device, through the connection element, is able at least to transmit through said connector information relating to the own functioning parameters thereof to the calculator unit, said functioning parameters being compared with predetermined information recorded in said first non-volatile memory of the calculator unit and comprising the characteristic properties of the display device, the graphical resolution of the screen, the characteristics of the user interface device, so as to identify, between said predetermined information recorded in said first non-volatile memory, the proper functioning parameters of the display device and to select the related functioning parameters of the calculator unit required to manage the, and communicate with, the display device, in order to obtain an automatic configuration of the display device, wherein the display device comprises its own second non-volatile memory that exchanges data and information with the microprocessor, the second non-volatile memory storing predetermined information relating to the functioning parameters of one or more of said calculator units, wherein, through the connection element, said display device is able to autonomously actuate a modification of its functioning parameters by setting a series of elementary graphic configurations until a sequence of data arriving from the calculator unit is received, the sequence of data intended to be displayed by the display device and suitable for the graphic configuration currently selected, said elementary graphic configurations, together with information for the recognition of determinate variants or types of the calculator unit, being registered in reference tables memorized in the second non-volatile memory of the display device.

2. The apparatus as in claim 1, wherein the connection element is a cable made according to USB 2.0 standard.

3. The apparatus as in claim 1, wherein the display device comprises a single container, said single container housing the screen, the connector, the user interface device and the microprocessor, and said single container having a single aperture towards the outside for the passage of said connector.

4. The apparatus as in claim 1, wherein the microprocessor is able to receive input data and information from the user interface device, to transmit data and information to the screen, a communication element being connected downstream of the connector for the transmission/reception of data between the connector and the microprocessor.

5. The apparatus as in claim 1, wherein the display device comprises a unit to manage the electric feed, able to transmit the electric feed received from the connector at least to the screen, the user interface device and the microprocessor.

6. The apparatus as in claim 1, wherein the calculator unit comprises a communication element connected downstream of said one or more connectors for the transmission/reception of data between said one or more connectors and the processor and the first non-volatile memory.

7. The apparatus as in claim 1, wherein the calculator unit, according to the result of the comparison, is able to organize the data to be received and transmitted to the display device so that they are compatible with the selected functioning parameters of the display device.

8. The apparatus as in claim 1, wherein said connector is configured to connect the display device and said calculator unit at any moment without causing functional anomalies of the electronic circuitry.

9. The apparatus as in claim 1, wherein said electric energy feed comes within the range of use of microelectronics and allows to feed the whole display device.

10. The apparatus as in claim 1, wherein said apparatus comprises a plurality of external connectors sharing the electric connections according to a circuit disposition in order to connect two or more peripheral units.

11. The apparatus as in claim 1, wherein said screen has advanced graphic functions suitable for the presentation of images with complex contents.

12. The apparatus as in claim 1, wherein said user interface device comprises a keyboard.

13. The apparatus as in claim 1, wherein said user interface device comprises a film with tactile functions which partly or totally covers the area of said screen.

14. The apparatus as in claim 1, wherein said user interface device comprises a microphone to impart voice commands.

15. The apparatus as in claim 1, wherein said microprocessor is suitable to exchange information with said calculator unit through said connector and to transfer said information in a format comprehensible for said screen.

16. The apparatus as in claim 1, wherein said apparatus comprises at least sensors dedicated to detect environmental values, such as temperature, pressure and humidity, or to monitor personal parameters, such as heart beat or blood pressure, or the position in which the device lies.

17. A method for the autonomous configuration of the functioning parameters of one or more remote interactive display devices and/or a calculator unit of an electronic processing apparatus, wherein said method provides a step of connecting the display device to the calculator unit by means of a single connection element by means of which said calculator unit both provides energy for the electric feed to the display device and also receives from and transmits data to the display device, and a step of automatic configuration in which said display device, at the moment of connection between one of its own connectors and the connection element, transmits information relating to the own functioning parameters thereof to the calculator unit, said calculator unit comparing the information received with predetermined information recorded therein and, according to the results of the comparison, identifies the desired functioning parameters of the display device and selects the related functioning parameters of the calculator unit required to manage the, and communicate with, the display device, in order to obtain an automatic configuration of the display device, wherein when the display device is connected to the calculator unit by means of the connection element, the display device autonomously actuates a modification of its own functioning parameters by setting a series of elementary graphic configurations until a sequence of data arriving from the calculator unit is received, the sequence of data intended to be displayed by the display device and suitable for the graphic configuration currently selected.

18. The method as in claim 17, wherein the calculator unit also organizes the data to be transmitted to the display device so that said data are compatible with the selected functioning parameters of the display device.

19. The method as in claim 17, wherein said functioning parameters comprise the characteristic properties of the display device, the graphic resolution of said screen, the characteristics of one or more user interface devices integrated into the display device.

* * * * *